(12) United States Patent
Emig et al.

(10) Patent No.: US 10,030,600 B2
(45) Date of Patent: Jul. 24, 2018

(54) METHODS AND SYSTEMS FOR ADJUSTING SENSORS AND ACTUATORS DURING ENGINE FUEL-OFF CONDITIONS

(71) Applicant: Ford Global Technologies, LLC, Dearborn, MI (US)

(72) Inventors: Tobias Emig, Gelsenkirchen (DE); Aaron John Oakley, Chelmsford (GB); Jon Dixon, Maldon (GB); Daniel Roettger, Eynatten (BE); Christoph Grewer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/446,949

(22) Filed: Mar. 1, 2017

(65) Prior Publication Data

US 2017/0260922 A1  Sep. 14, 2017

(30) Foreign Application Priority Data

Mar. 9, 2016  (DE) .................... 10 2016 203 798

(51) Int. Cl.
*F02D 41/12* (2006.01)
*F01N 11/00* (2006.01)
(Continued)

(52) U.S. Cl.
CPC .............. *F02D 41/123* (2013.01); *B60K 6/48* (2013.01); *B60W 20/15* (2016.01); *F01N 11/00* (2013.01); *F01N 11/007* (2013.01); *F01N 13/10* (2013.01); *F02D 11/02* (2013.01); *F02D 41/2441* (2013.01); *F02D 41/2464* (2013.01); *F02D 41/2474* (2013.01); *F02M 35/104* (2013.01); *F02M 35/10386* (2013.01); *F01N 2550/00* (2013.01); *F01N 2560/025* (2013.01);
(Continued)

(58) Field of Classification Search
CPC ........ B60K 6/48; B60W 20/15; F01N 11/007; F01N 13/10; F01N 2560/025; F01N 2560/026; F01N 2560/05; F02D 11/02; F02D 2200/1002; F02D 2200/101; F02D 41/123; F02M 35/10386; F02M 35/104
USPC ......................................................... 701/22
See application file for complete search history.

(56) References Cited

U.S. PATENT DOCUMENTS 6,616,569 B2  9/2003  Hoang et al.
7,516,007 B2  4/2009  Tamai et al.
(Continued)

FOREIGN PATENT DOCUMENTS

DE  102007026354 A1  12/2008
DE  102014204229 A1  9/2014
DE  102013216688 A1  2/2015

*Primary Examiner* — Tyler J Lee
(74) *Attorney, Agent, or Firm* — Julia Voutvras; McCoy Russell LLP (57) ABSTRACT

Methods and systems are provided for monitoring and adapting sensors and actuators in the induction system and exhaust system of an internal combustion engine during a period of time in which fresh air is flowing through the internal combustion engine without fuel delivery. According to the disclosure, the period of time in which fresh air is flowing through the internal combustion engine when fuel delivery is turned off and the monitoring and adapting is being carried out is extended by transferring torque produced by electric motor to the internal combustion engine.

20 Claims, 4 Drawing Sheets

(51) Int. Cl.
  *B60K 6/48* (2007.10)
  *F02M 35/104* (2006.01)
  *F02D 11/02* (2006.01)
  *B60W 20/15* (2016.01)
  *F02M 35/10* (2006.01)
  *F01N 13/10* (2010.01)
  *F02D 41/24* (2006.01)
  *F02D 41/14* (2006.01)
  *F02D 41/18* (2006.01)

(52) U.S. Cl.
  CPC .... *F01N 2560/026* (2013.01); *F01N 2560/05* (2013.01); *F02D 41/1454* (2013.01); *F02D 41/18* (2013.01); *F02D 41/2445* (2013.01); *F02D 41/2467* (2013.01); *F02D 2200/101* (2013.01); *F02D 2200/1002* (2013.01); *F02D 2250/24* (2013.01); *Y02T 10/47* (2013.01)

(56) References Cited

U.S. PATENT DOCUMENTS

| | | | |
|---|---|---|---|
| 7,840,337 | B2 | 11/2010 | Zillmer et al. |
| 8,230,955 | B2 | 7/2012 | Froeschl |
| 8,327,694 | B2 | 12/2012 | Roth et al. |
| 8,499,752 | B2 | 8/2013 | Bahlo et al. |
| 9,174,625 | B2* | 11/2015 | Baum .................. B60K 6/48 |
| 2002/0134596 | A1* | 9/2002 | Morimoto ........... B60K 6/485 |
| | | | 180/65.26 |
| 2008/0227589 | A1* | 9/2008 | Zillmer ................ B60K 6/48 |
| | | | 477/3 |
| 2010/0146938 | A1* | 6/2010 | Baum .................. B60K 6/48 |
| | | | 60/285 |
| 2010/0256849 | A1* | 10/2010 | Akimoto ............. B60K 6/445 |
| | | | 701/22 |
| 2013/0124025 | A1* | 5/2013 | Janczak .............. B60L 11/14 |
| | | | 701/22 |
| 2015/0057867 | A1 | 2/2015 | Kirstaetter |

* cited by examiner

METHODS AND SYSTEMS FOR ADJUSTING SENSORS AND ACTUATORS DURING ENGINE FUEL-OFF CONDITIONS

CROSS REFERENCE TO RELATED APPLICATION

The present application claims priority to German Patent Application No. 102016203798.6, filed Mar. 9, 2016. The entire contents of the above-referenced application are hereby incorporated by reference in its entirety for all purposes.

FIELD

The present description relates generally to system and methods for monitoring or adapting sensors and actuators in the induction system or exhaust system of an internal combustion engine during a period of time in which fresh air is flowing through the internal combustion engine without any fuel delivery.

BACKGROUND/SUMMARY

Some sensors in the induction system or exhaust system of an internal combustion engine must be monitored or adapted from time to time, and this must be carried out under the condition that the induction system and/or exhaust system is flooded with fresh air and thereby contains a defined amount of oxygen. In addition, some actuators in the induction system or exhaust system, for example injectors for the injection of small amounts of fuel into the induction system or exhaust system, require monitoring and adapting for the purpose of compensation under such defined conditions.

Defined conditions under which sensors or actuators in the induction system or exhaust system can be monitored or adapted are in particular achieved if the drive train is opened by disengaging the clutch, wherein engine braking is terminated by interrupting the fuel delivery, so that fresh air flows through the internal combustion engine while the revolution rate thereof decreases freely under the influence of friction and inertia.

The length of the period of time with a freely falling revolution rate that can be used for monitoring or adapting is however relatively short and may not be sufficient to fully flood the induction system and/or exhaust system with fresh air and still carry out the monitoring or adaptation tasks thereafter. Moreover, the length of the useful period of time depends on the revolution rate of the engine at the point in time of the opening of the drive train, and the rate of decrease in the revolution rate depends on the inertia of the engine and the friction of the engine.

Longer useful periods of time for monitoring and adaptation tasks are achieved if the monitoring or adapting are carried out in an engine braking mode with the drive train closed, but the useful length of such periods of time or the rate of decrease in the revolution rate depend on the current driving conditions and also on the drive train being kept closed for long enough, so that here too no well-defined conditions for monitoring and adaptation tasks are achieved.

As an example, the period of time available for monitoring and adaptation tasks may be extended to a required duration by reducing free rolling with the clutch disengaged for a duration, but this may be desirable for the driver.

The object of the invention is to specify a method for monitoring or adapting sensors or actuators in the induction system or exhaust system of an internal combustion engine that provides a defined and sufficiently long period of time for this purpose without irritating the driver.

In one example, the issues described above may be addressed by a vehicle method, comprising: monitoring and adapting a plurality of sensors and actuators in each of an induction system and an exhaust system of an internal combustion engine during a period of time in which fresh air is flowing through the internal combustion engine without fuel delivery, wherein the period of time in which fresh air is flowing through the internal combustion engine without fuel delivery is extended by transferring a positive torque produced by an electric motor to the internal combustion engine, the positive torque exerted by the electric motor on the internal combustion engine being smaller than a negative torque resulting from an internal friction of the internal combustion engine.

In this way, by transmitting a torque produced by electric motor to the internal combustion engine, the rate of decrease of engine speed over time (rpm/second) may be reduced and the period of time (window) in which fresh air flows through the internal combustion engine with the fuel delivery cut off and in which monitoring or adapting is carried out may be extended by.

DE 10 2007 026 354 A1 and EP 1 807 278 B1 disclose hybrid electric vehicles with an internal combustion engine that can be held at a defined revolution rate by means of torque produced by electric motor when fuel delivery is turned off if it runs with freely decreasing revolution rate or in the engine braking mode when fuel delivery is turned off. This enables the resumption of fuel delivery to be inhibited when the revolution rate falls below a minimum revolution rate in order to save fuel, such as for a completely different purpose than with the present disclosure.

The method according to the disclosure is particularly suitable for being carried out in a motor vehicle with a hybrid drive by means of an internal combustion engine and at least an electric motor, such as an electric motor that can propel the vehicle or can at least support the internal combustion engine when propelling the vehicle. Such an electric motor is also capable of driving the internal combustion engine at the revolution rates required for carrying out the method.

It is also possible that the method could be carried out in a micro hybrid vehicle, if for example the micro hybrid vehicle comprises a crankshaft starter motor that can also be used as a generator that can produce positive torque at higher revolution rates than are required for starting the internal combustion engine.

During the monitoring or adapting, the at least one electric motor may exert a positive (i.e. driving) torque on the internal combustion engine that is smaller than the negative (i.e. braking) torque resulting from the internal friction of the internal combustion engine. The drive train of the motor vehicle may be open during the monitoring or adapting, but the method may also be used to extend an engine braking mode with the drive train closed if monitoring or adapting is currently taking place and the revolution rate of the engine is decreasing too rapidly under the current driving conditions.

The positive torque that is produced by electric motor, which is exerted on the internal combustion engine during the monitoring or adapting, may be essentially constant. In this way, well-defined conditions are obtained for the monitoring or adapting. The exertion of the positive torque is preferably ended once the monitoring or adapting is completed.

The disclosure can not only be used to monitor or adapt sensors or actuators, but also to monitor or adapt positions of components of the internal combustion engine, such as for example for the adaptation of tooth angle and top dead center.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
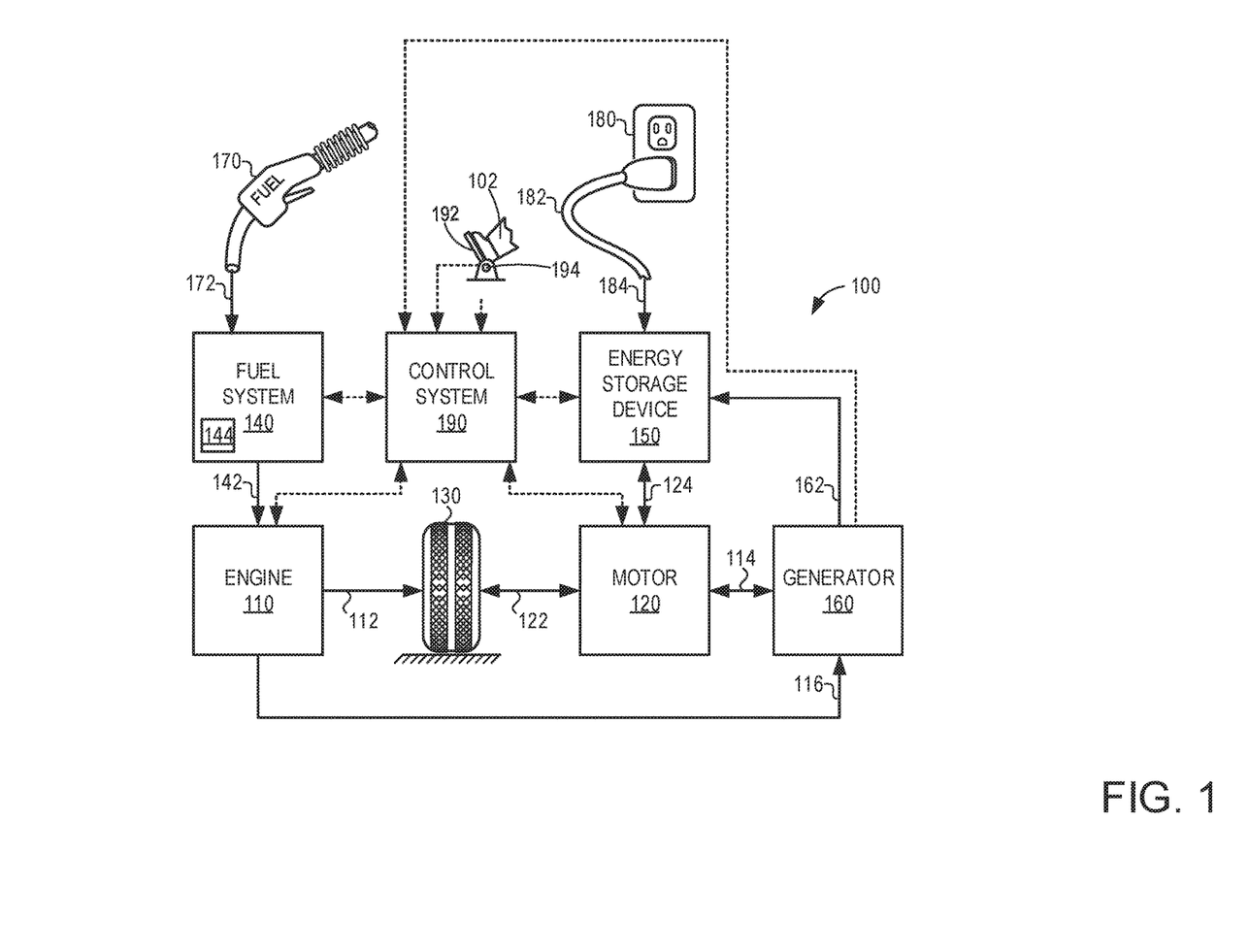
FIG. 1 shows an example propulsion system for a hybrid vehicle
Figure 2:
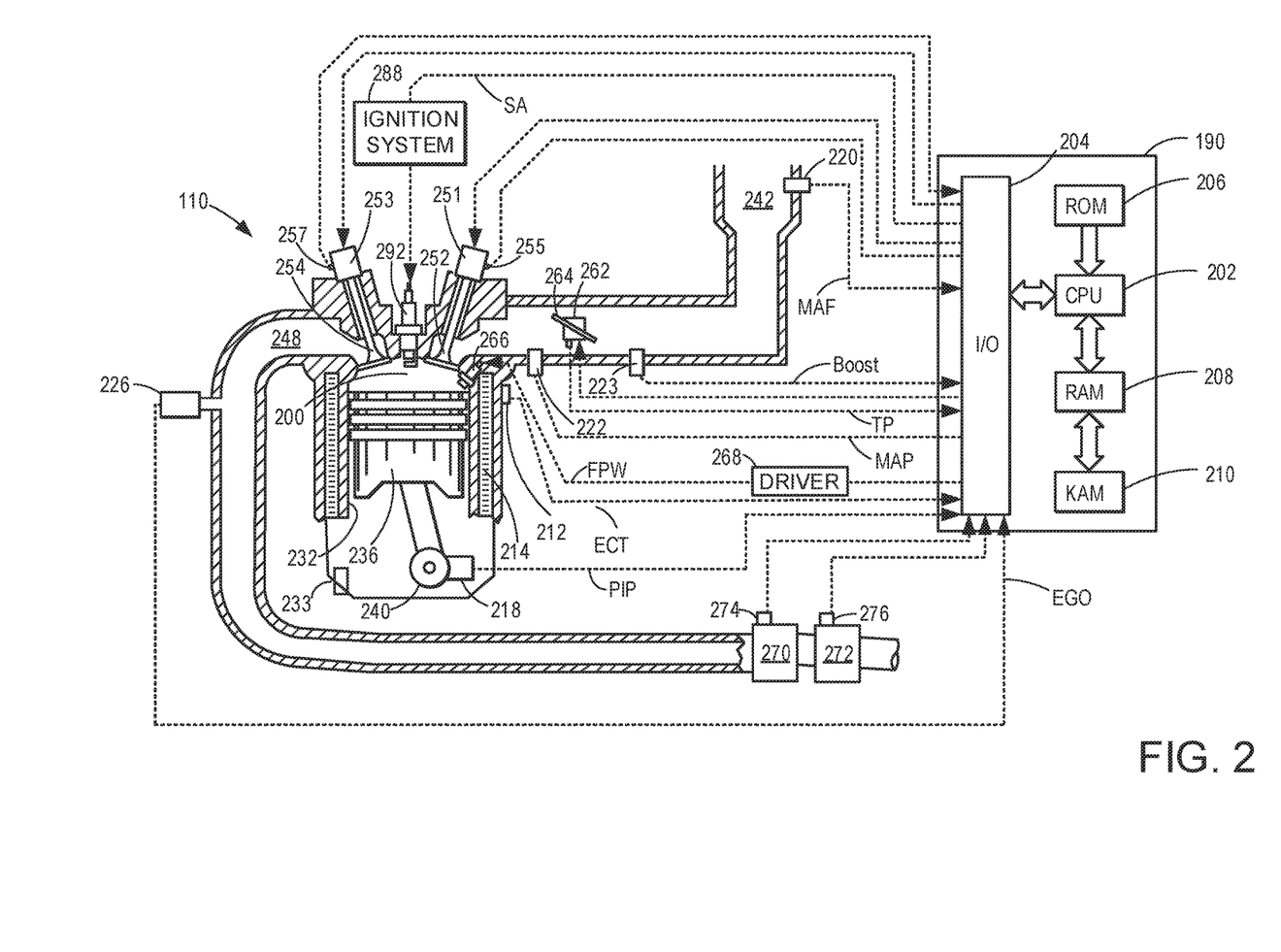
FIG. 2 shows a schematic diagram of an internal combustion engine system

The following description relates to systems and methods for a plug-in hybrid vehicle, such as shown in FIG. 1, including an internal combustion engine, such as shown in FIG. 2. An engine controller may be configured to perform control routines, such as the example routine of FIG. 3 to reduce a rate of decrease in engine speed during a deceleration fuel shut-off (DFSO) event to increase the time window available between the initiation of the DFSO event and the time when the engine speed reduces to the idling speed. An example of adjustment of the rate of decrease in engine speed during a DFSO event is shown in FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

Control system 190 may communicate with one or more of engine 110, motor 120, fuel system 140, energy storage device 150, and generator 160. The control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

In one example, during a lower than threshold engine torque demand, fueling may be suspended to a plurality of cylinders of the engine 110 and a deceleration fuel shut-off event (DFSO) may be initiated. During DFSO, as fuel is not injected, fresh air may flow through the engine components. Also, during DFSO, the engine speed may steadily decrease and reach the engine idling speed. During a time window between the initiation of the DFSO event and when the engine speed reduces to idling speed, a plurality of engine system sensors including each of the mass flow sensor, the intake oxygen sensor, the exhaust oxygen sensor, the nitrogen oxide sensor, and the particulate matter sensor may be dynamically calibrated as fresh air flows through the engine system. In order to extend the time window available for the dynamic calibrations, the electric motor 120 may be operated produce a positive torque to partially balance a negative frictional torque produced at the plurality of cylinders. The dynamically calibrating may be carried out at a higher than threshold engine speed with the drive train open, the threshold engine speed being the idling speed. The positive torque via the electric motor 120 may be of constant magnitude and may be applied on to the engine 110 until the engine speed reduces to below the threshold engine speed, a magnitude of the positive torque smaller relative to a magnitude of the negative frictional torque.

FIG. 2 illustrates a non-limiting example of a cylinder 200 of engine 110, including the intake and exhaust system components that interface with the cylinder. In one example, engine 110 may be engine 110 in FIG. 1. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268. In one example, during a deceleration fuel shut-off (DFSO) event, in the window (time) between an initiation of the DFSO event and when the engine speed reduces to the idling speed, one or more fuel injectors may be dynamically calibrated by injecting an amount of fuel into one or more cylinders via the one or more fuel injectors and then monitoring an amount of torque generated. Also, during injection of the amount of fuel into the one or more individual cylinders, a change in engine speed may be monitored. During injection of the amount of fuel into one or more individual cylinders, fuel dispersion among cylinders may be measured and in response to a higher than threshold deviation in dispersion, a fueling schedule may be adjusted in a subsequent engine cycle.

One or more exhaust after treatment devices may be coupled to the exhaust passage 248 for treating exhaust before it is released to the atmosphere. In one example, a NOx catalyst 270 and a particulate filter 272 may be coupled to the exhaust passage. A NOx sensor 274 may be coupled to the catalyst 270 to estimate the NOx conversion efficiency of the catalyst and a particulate matter sensor 276 may be coupled to the particulate filter 272 to estimate an amount of particulate matter accumulated on the filter 272. During the DFSO event, in the window (time) between the initiation of the DFSO event and when the engine speed reduces to the idling speed, dynamic calibrations of engine exhaust system sensors including the nitrogen oxide sensor 274 and a particulate matter sensor 276 may be conducted. After the DFSO event, an updated calibration may be used for the operation of each of the exhaust system sensors.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake gas oxygen content via intake gas composition sensor (not shown), an indication of PCV exhaust gas moisture and hydrocarbon content via PCV exhaust line gas sensor 233, an indication of intake valve position via sensor 255, and an indication of exhaust valve position via sensor 257, an indication of catalyst NOx level via sensor 274, an indication of particulate filter soot level via sensor 276, among others. For example, sensor 233 may be a humidity sensor, oxygen sensor, hydrocarbon sensor, and/or combinations thereof.

Furthermore, the control system may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

In this way, the systems of FIGS. 1 and 2 provide for hybrid vehicle system, comprising: an engine including an engine intake manifold, an engine exhaust manifold, and a plurality of cylinders, an electric motor coupled to a battery, one or more fuel injectors coupled to the plurality of cylinders and the engine intake manifold, a pedal position sensor; an exhaust catalyst including a nitrogen oxide sensor, a particulate filter including a particulate matter sensor, and an exhaust oxygen sensor coupled to the engine exhaust manifold, a mass flow sensor and an intake oxygen sensor coupled to the engine intake manifold, and a controller with computer readable instructions stored on non-transitory memory for: in response to a lower than threshold engine torque demand, suspending fueling to the plurality of cylinders, opening the drive-train, operating the electric motor to produce a positive torque to partially balance a negative frictional torque produced at the plurality of cylinders, and dynamically calibrating each of the mass flow sensor, the intake oxygen sensor, the exhaust oxygen sensor, the nitrogen oxide sensor, and the particulate matter sensor.

Figure 3:
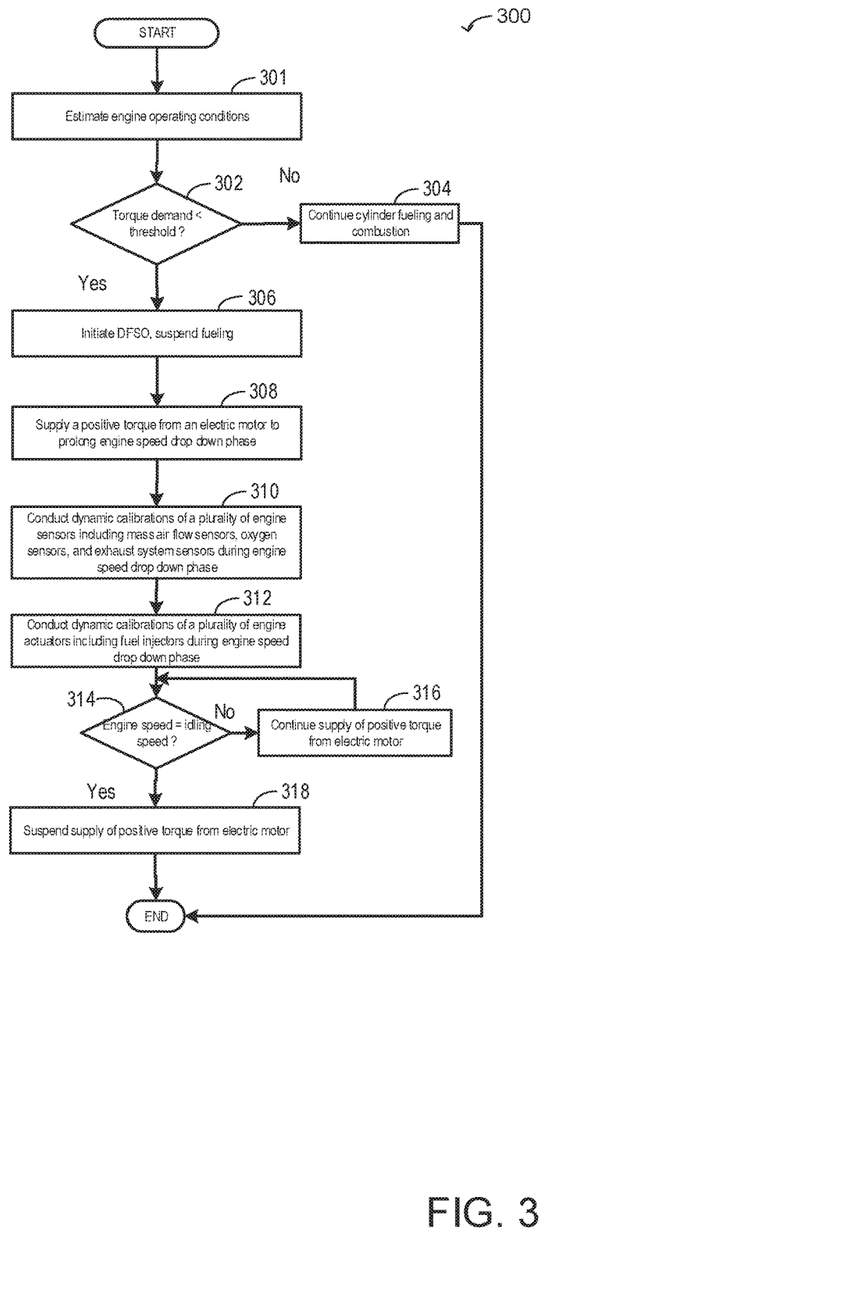
FIG. 3 shows a flow chart illustrating an example method that may be implemented for adjusting a rate of decrease in engine speed for monitoring and adapting sensors and actuators.
Figure 4:
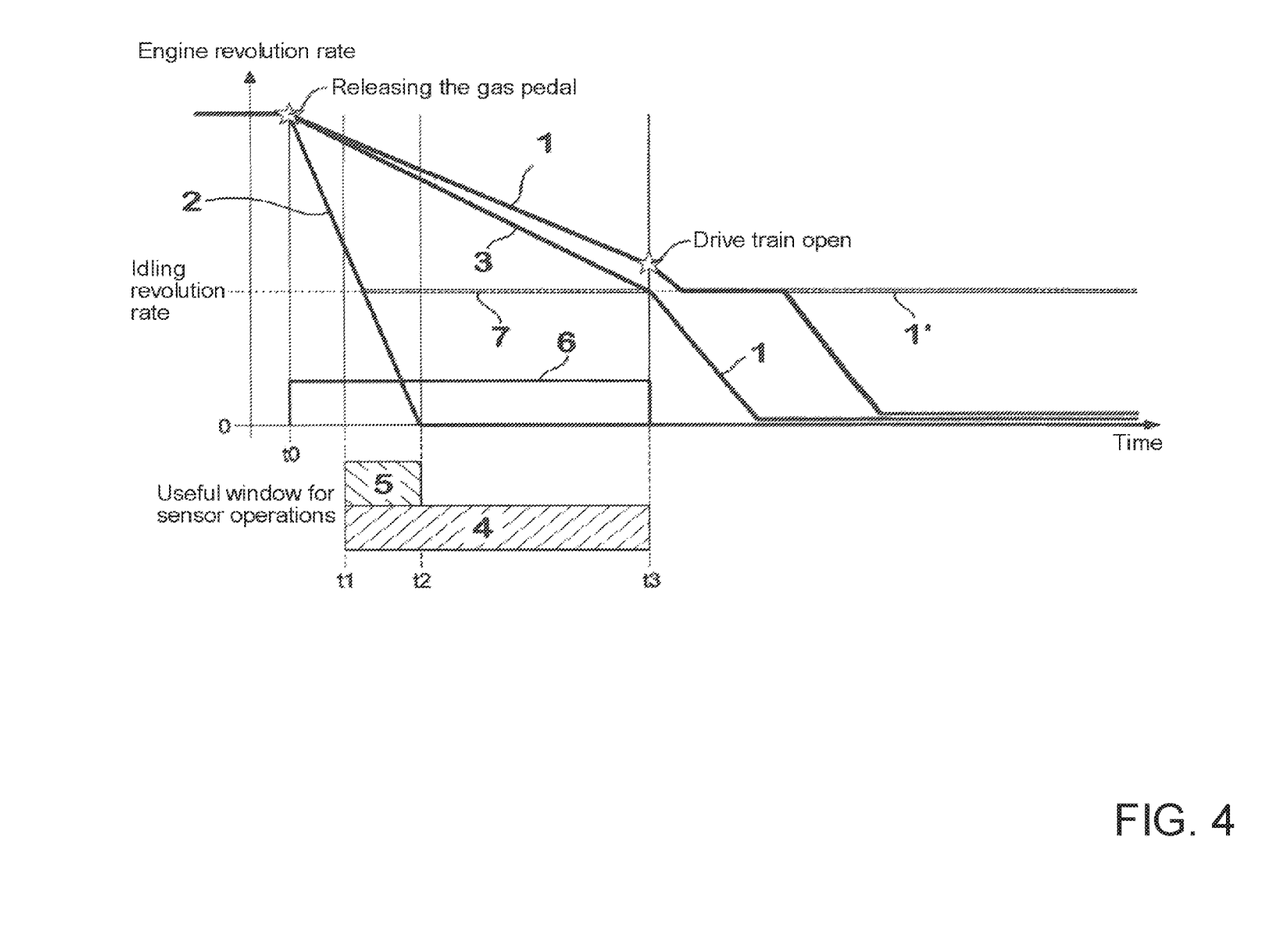
FIG. 4 shows an example of adjusting the rate of decrease in engine speed during a deceleration fuel shut-off (DFSO) event.

FIG. 3 illustrates a first example method 300 that may be implemented for adjusting a rate of decrease in engine speed during a deceleration fuel shut-off (DFSO) event. Instructions for carrying out method 300 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 302, the routine includes estimating and/or measuring engine operating conditions. Conditions assessed may include, for example, engine temperature, engine load, driver torque demand, engine speed, throttle position, exhaust pressure, exhaust air-fuel-ratio, ambient conditions including ambient temperature, pressure, and humidity, MAP, MAF, boost, etc.

At 304, the routine includes determining if the driver torque demand is lower than a threshold. Driver torque demand may be estimated based on inputs from a pedal position sensor. If it is determined that the driver torque demand is higher than the threshold, at 304, fuel injection to one or more cylinders may be continued for combustion and supply of engine torque. The torque generated by combustion may be used to propel the vehicle. In one example, as engine torque is used for vehicle operation, the electric motor may not be operated at this time.

If it is determined that the driver torque demand is lower than the threshold, at 306, a deceleration fuel shut-off (DFSO) event may be initiated and fuel injection to the cylinders may be suspended. As the driver torque demand is lower than the threshold, generation of engine torque via combustion may not be desired. By initiating a DFSO event, fuel efficiency may be improved during lower driver torque demand. During DFSO, as fuel is not injected, 100% air may flow through the cylinders and the engine exhaust. As combustion is no longer carried out, the engine speed may start decreasing due to an influence of frictional forces (creating negative torque) acting on the engine cylinders.

At 308, in order to decrease the rate of decrease of engine speed with respect to time (rpm/sec) and prolong the duration of an engine speed drop-down phase, the electric motor may be operated to supply a positive torque. The positive torque may be smaller in magnitude relative to the negative frictional torque and thereby may partially balance the negative frictional torque produced at the plurality of cylinders. In one example, a constant positive torque may be applied via the electric motor until the engine speed reduces to an idling speed. In another example, the magnitude of the positive torque applied via the electric motor may be adjusted based on engine speed, the magnitude increased as the engine speed at the initiation of the DFSO event decreases the positive torque decreased as the engine speed decreases. As such, the controller may determine the magnitude of the positive torque to be applied to the engine based on engine speed at initiation of the DFSO event and a desired time window between the initiation of the DFSO event and a time when the engine speed reduces to zero such that a set of calibrations for a plurality of engine sensors may be completed. The controller may determine the magnitude positive torque through a determination that directly takes into account engine speed at initiation of the DFSO event and the desired time window such as increasing the positive torque as the desired time window decrease. The controller may alternatively determine the positive torque by referring to a look-up table stored in the controller's memory, input to the look-up table being each of the engine speed at initiation of the DFSO event and the desired time window, and the output being the positive torque.

Also, upon initiation of the DFSO event, the drive train may be opened. Due to the open drive train, the engine drag (frictional) torque from the overall road load of the vehicle may be reduced. By reducing the drag torque, the duration of an engine speed drop-down phase may be further prolonged.

At 310, during the engine speed drop-down phase such as the time duration (window) between an initiation of the DFSO event and when an engine speed reduces to an idling speed, dynamic calibration of a plurality of engine sensors may be carried out. During this engine speed drop-down phase, pure air with a known oxygen content (21%) may flow through the engine sensors. In one example, in the presence of the known amount of oxygen in the intake airstream and the exhaust airstream, calibration of each of an intake oxygen sensor and an exhaust oxygen sensor may be carried out. In another example, plausibility of the air mass flow signal as estimated via a mass air flow sensor may be checked at different engine speeds and corresponding engine volumetric efficiencies. Also, exhaust sensors such as the NOx sensor and the particulate matter sensor may be calibrated during the time window in the DFSO event when the engine speed is above the idling speed. As such, in response to a signal estimated via an engine sensor being different from an expected (computed) signal, a diagnostic code may be set indicating degradation in the specific engine sensor. Also, for future engine operations, the updated calibrations obtained during the DFSO event may be utilized to improve robustness of the sensor readings. By extending the duration of the engine speed drop-down phase, the time window between the initiation of the DFSO event and when an engine speed reduces to an idling speed may be extended and the aforementioned dynamic calibrations of the engine sensors may be completed within the time window.

At 312, in the time window between an initiation of the DFSO event and when an engine speed reduces to an idling speed, dynamic calibration of a plurality of engine actuators including fuel injectors may also be carried out. In one example, even though there is no demand for fuel injection during the DFSO event, a smaller amount of fuel (relative to the amount of fuel injected for combustion) may be injected to one or more engine cylinders and the torque impact caused by the injected amount of fuel may be estimated and calibrated. In another example, fuel may be injected multiple times at different engine speeds during the time window and after each fuel injection, a change in engine speed may be monitored. In yet another example, during injecting the amount of fuel into one or more individual cylinders during the time window, fuel dispersion among cylinders may be measured and in response to a higher than threshold deviation in dispersion, a fueling schedule may be adjusted. As such, the fueling pulse width in subsequent engine cycles may be adjusted to account for the deviation in dispersion of fuel among cylinders By extending the window, a plurality of calibrations of the fuel injectors may be carried out at different engine speeds.

At 314, the routine includes determining if the engine speed is substantially equal to the idling speed. Once the engine speed reduces to the idling speed, further calibrations and diagnostics of the engine sensors and actuators may not be carried out. If it is confirmed that the engine speed is above the idling speed, at 316, positive torque may be continued to be applied to the engine to extend the duration of the engine speed drop-down phase during the DFSO event.

If it is confirmed that the engine speed has reduced to the idling speed, the controller may send a signal to the electric motor to suspend the supply of positive torque and the operation of the electric motor may be deactivated. After reaching the idling speed, the engine speed may further reduce to zero.

In this way, a method for a hybrid vehicle, comprises: during a deceleration fuel shut-off (DFSO) event, applying a positive torque on an engine via an electric motor until a time when an engine speed reaches an idling speed, conducting dynamic calibrations of one or more engine sensors during a window between an initiation of the DFSO event and when the engine speed reaches the idling speed, and suspending the dynamic calibrations of the of one or more engine sensors once the engine speed decreases below the idling speed.

An example of adjustment of the rate of decrease in engine speed during a DFSO event is shown in FIG. 4. The y-axis shows engine revolution rate (in rpm) and the x-axis denotes time (in seconds). Plot 1 shows a typical time profile of the revolution rate of an internal combustion engine in a conventional motor vehicle or in a so-called micro hybrid vehicle, a motor vehicle with an automatic start/stop system using a rather conventionally dimensioned electric crankshaft-starter motor and with braking energy recovery for charging a rather small starter battery.

If the driver takes his foot off the gas pedal at a point in time t0 without depressing the clutch, i.e. with the drive train closed, the delivery of fuel is automatically turned off and the vehicle is in an engine braking mode, in which the revolution rate decreases relatively slowly until, for example, the driver depresses the clutch at a point in time t3 and thereby opens the drive train. The revolution rate then reduces more rapidly to the idling revolution rate, and then it reduces to zero after a short time in the case of an automatic start/stop system, as shown in plot 1. The engine revolution rate may remain in a conventional motor vehicle, as in shown in branch 1' of the plot.

At a point in time t1 after the point in time t0, the induction system and/or exhaust system are flooded with fresh air and thereby contain a defined amount of oxygen, which enables monitoring and adapting of sensors and actuators in the induction system and exhaust system, since the time window 4 that is available for this, extending from t1 to t3 in this example, is long enough.

Plot 2 shows a typical time profile of the revolution rate of an internal combustion engine in a motor vehicle with a hybrid drivetrain by means of an internal combustion engine and an electric motor.

If the driver takes his foot off the gas pedal at the point in time t0, with a hybrid vehicle the drive train is typically opened automatically and the revolution rate of the internal combustion engine freely decreases rapidly until it is zero at the point in time t2. A time window 5 available for monitoring and adapting sensors or actuators extending from t1 to t2 is then often too short.

Plot 3 shows a time profile of the revolution rate of an internal combustion engine in a motor vehicle with a hybrid drivetrain, wherein the period of time in which fresh air is flowing through the internal combustion engine when fuel delivery is turned off and the monitoring or adapting are being carried out is extended by transferring torque produced by electric motor to the internal combustion engine.

During period of time extending from t0 to t3, the electric motor of the hybrid vehicle exerts a constant driving torque on the internal combustion engine that is somewhat smaller than the braking torque resulting from the internal friction of the internal combustion engine. As a result, the revolution rate of the engine slowly decreases so that the longer time window 4 is available for monitoring and adapting sensors or actuators.

The driving torque is shown in the figure as a square-wave signal 6 for actuating the electric motor. At the end of the time window 4, the driving torque is turned off again and the revolution rate of the internal combustion engine decreases more rapidly again to zero. The segment of plot 3 lying between the points in time t0 and t3 decreases obliquely in this exemplary embodiment, as the driving torque is smaller than the frictional torque of the internal combustion engine.

Alternatively, the driving torque could be made to have the same magnitude as the frictional torque and only be allowed to act from the point in time at which the revolution rate of the engine has decreased to the idling revolution rate. In such a case, the revolution rate of the engine would initially follow plot 2 until it reaches the idling revolution rate, and would then be held at the idling revolution rate by electric motor at least until the point in time t3, so that the revolution rate of the engine follows arm of the plot 7 shown in the figure. In this case, however, the period of time available for monitoring and adaptation tasks would be somewhat shorter than the time window 4 in the preceding exemplary embodiment.

In other exemplary embodiments, the torque driving the internal combustion engine between the points in time t0 and t3 could move along a line other than a straight line, so that the revolution rate of the internal combustion engine between the points in time t0 and t3 decreases along any curve that passes between the corresponding segments of plots 3 and 2. In addition, the period of time available for monitoring and adaptation tasks could be extended by increasing the magnitude of the positive torque exerted on the engine.

In this way, by operating an electric machine to generate a positive torque during engine speed drop down phase in a DFSO event, the rate of decrease in engine speed may be reduced and the window between the initiation of the DFSO event and a time when the engine speed reaches idling speed may be prolonged. The technical effect of prolonging the window is that within the window, calibration and diagnostics of a number of engine sensors may be carried out before the engine speed reduces to the idling speed. By performing calibration and diagnostics within the time window, the fresh air flowing through the engine components may be utilized for the calibration and diagnostics during the DFSO event.

An example vehicle method comprises: monitoring and adapting a plurality of sensors and actuators in each of an induction system and an exhaust system of an internal combustion engine during a period of time in which fresh air is flowing through the internal combustion engine without fuel delivery, wherein the period of time in which fresh air is flowing through the internal combustion engine without fuel delivery is extended by transferring a positive torque produced by an electric motor to the internal combustion engine, the positive torque exerted by the electric motor on the internal combustion engine being smaller than a negative torque resulting from an internal friction of the internal combustion engine. In any preceding example, additionally or optionally, the vehicle includes a hybrid drivetrain with the internal combustion engine and the electric motor. In any or all of the preceding examples, additionally or optionally, during the monitoring and adapting of the plurality of sensors and actuators, the drivetrain of the vehicle is opened. In any or all of the preceding examples, additionally or optionally, the positive torque exerted by the electric motor on the internal combustion engine is of constant magnitude. Any or all of the preceding examples further comprising, additionally or optionally, suspending exertion of the positive torque once the monitoring and adapting of the plurality of sensors and actuators is completed. Any or all of the preceding examples further comprising, additionally or optionally, suspending exertion of the positive torque once engine speed reaches an idling speed. In any or all of the preceding examples, additionally or optionally, monitoring and adapting a plurality of sensors and actuators include plausibility checking of an air mass flow signal as estimated via an air mass flow sensor. In any or all of the preceding examples, additionally or optionally, monitoring and adapting a plurality of sensors and actuators further include monitoring a change in torque by injection of an amount of fuel into one or more cylinders via one or more fuel injectors.

Another example method for a hybrid vehicle comprises: during a deceleration fuel shut-off (DFSO) event, applying a positive torque on an engine via an electric motor until a time when an engine speed reaches an idling speed, conducting dynamic calibrations of one or more engine sensors during a window between an initiation of the DFSO event and when the engine speed reaches the idling speed, and suspending the dynamic calibrations of the of one or more engine sensors once the engine speed decreases below the idling speed. In any of the preceding examples, additionally or optionally, applying the positive torque includes, within the window, applying a constant positive torque, a magnitude of the positive torque lower than a magnitude of a negative torque generated by frictional forces on the engine. In any or all of the preceding examples, additionally or optionally, the magnitude of the positive torque is based on an engine speed at the initiation of the DFSO event, the magnitude increased as the engine speed at the initiation of the DFSO event decreases. In any or all of the preceding examples, additionally or optionally, conducting dynamic calibrations of one or more engine sensors includes conducting calibrations of an air mass flow signal produced by a mass air flow sensor at one or more engine speeds. In any or all of the preceding examples, additionally or optionally, conducting dynamic calibrations of one or more engine sensors further include, as fresh air comprising an amount of oxygen flows through the engine during the window, conducting dynamic calibrations of each of an exhaust oxygen sensor and an intake oxygen sensor. In any or all of the preceding examples, additionally or optionally, conducting dynamic calibrations of one or more engine sensors further include conducting dynamic calibrations of engine exhaust system sensors including a nitrogen oxide sensor and a particulate matter sensor coupled to one or more exhaust after treatment devices. Any or all of the preceding examples further comprising, additionally or optionally, conducting dynamic calibrations of one or more engine actuators including one or more fuel injectors by injecting an amount of fuel into one or more cylinders via the one or more fuel injectors and monitoring an amount of torque generated. Any or all of the preceding examples further comprising, additionally or optionally, during injecting the amount of fuel into the one or more individual cylinders, monitoring a change in engine speed. Any or all of the preceding examples further comprising, additionally or optionally, during injecting the amount of fuel into one or more individual cylinders, measuring fuel dispersion among cylinders and in response to a higher than threshold deviation in dispersion, adjusting a fueling schedule in a subsequent engine cycle.

In yet another example, a hybrid vehicle system comprises: an engine including an engine intake manifold, an engine exhaust manifold, and a plurality of cylinders, an electric motor coupled to a battery, one or more fuel injectors coupled to the plurality of cylinders and the engine intake manifold, a pedal position sensor, an exhaust catalyst including a nitrogen oxide sensor, a particulate filter including a particulate matter sensor, and an exhaust oxygen sensor coupled to the engine exhaust manifold, a mass flow sensor and an intake oxygen sensor coupled to the engine intake manifold, and a controller with computer readable instructions stored on non-transitory memory for: in response to a lower than threshold engine torque demand, suspending fueling to the plurality of cylinders, opening the drive-train, operating the electric motor to produce a positive torque to partially balance a negative frictional torque produced at the plurality of cylinders, and dynamically calibrating each of the mass flow sensor, the intake oxygen sensor, the exhaust oxygen sensor, the nitrogen oxide sensor, and the particulate matter sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
monitoring and adapting a plurality of sensors and actuators in each of an induction system and an exhaust system of an internal combustion engine during a period of time in which fresh air is flowing through the internal combustion engine without fuel delivery,
wherein the period of time in which fresh air is flowing through the internal combustion engine without fuel delivery is extended by transferring a positive torque produced by an electric motor to the internal combustion engine, the positive torque exerted by the electric motor on the internal combustion engine being smaller than a negative torque resulting from an internal friction of the internal combustion engine.

2. The method of claim 1, wherein the vehicle includes a hybrid drivetrain with the internal combustion engine and the electric motor.

3. The method of claim 1, wherein during the monitoring and adapting of the plurality of sensors and actuators, the drivetrain of the vehicle is opened.

4. The method of claim 1, wherein the positive torque exerted by the electric motor on the internal combustion engine is of constant magnitude.

5. The method of claim 1, further comprising, suspending exertion of the positive torque once the monitoring and adapting of the plurality of sensors and actuators is completed.

6. The method of claim 1, further comprising, suspending exertion of the positive torque once engine speed reaches an idling speed.

7. The method of claim 1, wherein monitoring and adapting a plurality of sensors and actuators include plausibility checking of an air mass flow signal as estimated via an air mass flow sensor.

8. The method of claim 1, wherein monitoring and adapting a plurality of sensors and actuators further include monitoring a change in torque by injection of an amount of fuel into one or more cylinders via one or more fuel injectors.

9. A method for a hybrid vehicle, comprising:
during a deceleration fuel shut-off (DFSO) event,
applying a positive torque on an engine via an electric motor until a time when an engine speed reaches an idling speed, conducting dynamic calibrations of one or more engine sensors during a window between an initiation of the DFSO event and when the engine speed reaches the idling speed, and suspending the dynamic calibrations of the of one or more engine sensors once the engine speed decreases below the idling speed.

10. The method of claim 9, wherein applying the positive torque includes, within the window, applying a constant positive torque, a magnitude of the positive torque lower than a magnitude of a negative torque generated by frictional forces on the engine.

11. The method of claim 9, wherein the magnitude of the positive torque is based on an engine speed at the initiation of the DFSO event, the magnitude increased as the engine speed at the initiation of the DFSO event decreases.

12. The method of claim 9, wherein conducting dynamic calibrations of one or more engine sensors includes conducting calibrations of an air mass flow signal produced by a mass air flow sensor at one or more engine speeds.

13. The method of claim 9, wherein conducting dynamic calibrations of one or more engine sensors further include, as fresh air comprising an amount of oxygen flows through the engine during the window, conducting dynamic calibrations of each of an exhaust oxygen sensor and an intake oxygen sensor.

14. The method of claim 9, wherein conducting dynamic calibrations of one or more engine sensors further include conducting dynamic calibrations of engine exhaust system sensors including a nitrogen oxide sensor and a particulate matter sensor coupled to one or more exhaust after treatment devices.

15. The method of claim 9, further comprising, conducting dynamic calibrations of one or more engine actuators including one or more fuel injectors by injecting an amount of fuel into one or more cylinders via the one or more fuel injectors and monitoring an amount of torque generated.

16. The method of claim 15, further comprising, during injecting the amount of fuel into the one or more individual cylinders, monitoring a change in engine speed.

17. The method of claim 15, further comprising, during injecting the amount of fuel into one or more individual cylinders, measuring fuel dispersion among cylinders and in response to a higher than threshold deviation in dispersion, adjusting a fueling schedule in a subsequent engine cycle.

18. A hybrid vehicle system, comprising:
an engine including an engine intake manifold, an engine exhaust manifold, and a plurality of cylinders;
an electric motor coupled to a battery;
one or more fuel injectors coupled to the plurality of cylinders and the engine intake manifold;
a pedal position sensor;

an exhaust catalyst including a nitrogen oxide sensor, a particulate filter including a particulate matter sensor, and an exhaust oxygen sensor coupled to the engine exhaust manifold;

a mass flow sensor and an intake oxygen sensor coupled to the engine intake manifold; and a controller with computer readable instructions stored on non-transitory memory for:

in response to a lower than threshold engine torque demand, suspending fueling to the plurality of cylinders, opening the drive-train, operating the electric motor to produce a positive torque to partially balance a negative frictional torque produced at the plurality of cylinders, and dynamically calibrating each of the mass flow sensor, the intake oxygen sensor, the exhaust oxygen sensor, the nitrogen oxide sensor, and the particulate matter sensor.

19. The system of claim 18, wherein the dynamically calibrating is carried out at a higher than threshold engine speed with the drive train open, the threshold engine speed is the idling speed.

20. The system of claim 19, wherein the positive torque is of constant magnitude and is applied on to the engine until the engine speed reduces to below the threshold engine speed, a magnitude of the positive torque smaller relative to a magnitude of the negative frictional torque.

* * * * *